(12) United States Patent
Hauber et al.

(10) Patent No.: US 9,475,730 B2
(45) Date of Patent: Oct. 25, 2016

(54) SYSTEM AND METHOD FOR THE CONSTRUCTION OF BOUND FIBROUS MATS

(75) Inventors: Robert J. Hauber, Tampa, FL (US); Gerald D. Boydston, Cody, WY (US)

(73) Assignee: CertainTeed Gypsum, Inc., Tampa, FL (US)

( * ) Notice: Subject to any disclaimer, the term of this patent is extended or adjusted under 35 U.S.C. 154(b) by 515 days.

(21) Appl. No.: 13/491,746

(22) Filed: Jun. 8, 2012

(65) Prior Publication Data

US 2013/0327461 A1    Dec. 12, 2013

(51) Int. Cl.

| | |
|---|---|
| *B29C 35/08* | (2006.01) |
| *C04B 20/10* | (2006.01) |
| *C04B 28/14* | (2006.01) |
| *B28B 19/00* | (2006.01) |
| *B28B 23/00* | (2006.01) |
| *C04B 26/04* | (2006.01) |
| *B32B 5/26* | (2006.01) |
| *D04H 3/12* | (2006.01) |
| *B32B 5/02* | (2006.01) |
| *B32B 5/08* | (2006.01) |
| *D04H 3/147* | (2012.01) |
| *C04B 111/00* | (2006.01) |
| *B29B 15/12* | (2006.01) |

(52) U.S. Cl.
CPC ....... *C04B 20/1033* (2013.01); *B28B 19/0092* (2013.01); *B28B 23/0006* (2013.01); *B32B 5/022* (2013.01); *B32B 5/024* (2013.01); *B32B 5/08* (2013.01); *B32B 5/26* (2013.01); *C04B 26/04* (2013.01); *C04B 28/14* (2013.01); *D04H 3/12* (2013.01); *D04H 3/147* (2013.01); *B29B 15/122* (2013.01); *B32B 2255/02* (2013.01); *B32B 2255/26* (2013.01); *B32B 2262/10* (2013.01); *B32B 2262/105* (2013.01); *B32B 2262/14* (2013.01); *B32B 2307/304* (2013.01); *B32B 2307/3065* (2013.01); *B32B 2307/41* (2013.01); *B32B 2307/414* (2013.01); *B32B 2307/554* (2013.01); *B32B 2307/71* (2013.01); *B32B 2307/724* (2013.01); *B32B 2307/726* (2013.01); *B32B 2419/00* (2013.01); *C04B 2111/00629* (2013.01)

(58) Field of Classification Search
CPC ... B05B 12/12; B28B 5/028; B28B 19/0092; B28B 23/0006; E04C 2/043
USPC ............................................ 118/712; 156/42
See application file for complete search history.

(56) References Cited

U.S. PATENT DOCUMENTS

| | | | |
|---|---|---|---|
| 5,051,122 | A | 9/1991 | Reese et al. |
| 5,565,049 | A | 10/1996 | Simmons et al. |
| 6,524,679 | B2 | 2/2003 | Hauber et al. |
| 2010/0055431 | A1 | 3/2010 | College |

*Primary Examiner* — Joseph S Del Sole
*Assistant Examiner* — John Robitaille
(74) *Attorney, Agent, or Firm* — GrayRobinson, P.A.; Michael J. Colitz, III

(57) ABSTRACT

Disclosed is a system and method for constructing fibrous mats. In accordance with the disclosure, continuous lengths of filament are pre-coated with a liquefied thermoplastic. The pre-coated filaments are then laid down upon a belt to form a fibrous mat. The filaments can be laid down in continuous lengths or they can be chopped into discontinuous lengths. The filaments are heated after they have been laid down in order to re-liquefy the thermoplastic and facilitate bonding between intersecting fibers. The disclosure further relates to a system and method for incorporating constructed fibrous mats into a composite building board.

6 Claims, 4 Drawing Sheets

SYSTEM AND METHOD FOR THE CONSTRUCTION OF BOUND FIBROUS MATS

TECHNICAL FIELD

This disclosure relates to a system for constructing fibrous mats. This disclosure further relates to a method for incorporating bound fibrous mats into composite building boards.

BACKGROUND OF THE INVENTION

The background art contains several examples of methods for constructing fibrous mats. An example is disclosed in U.S. Pat. No. 5,565,049 to Simmons, et al. Simmons discloses a method of making mats from chopped fibrous material. The method uses an elongated endless transport belt that extends over a pair of rollers. At an initial station, a series of spools deliver continuous fiber strands into a cutting station. The cut strands are deposited onto the belt to form a loose fibrous mat structure. The mat structure is then transported to a misting station where nozzles spray a fine mist of water onto the mat structure. An adhesive powder is then applied uniformly over the top surface of the mat structure. The powdered adhesive takes the form of granules that are metered out of an adhesive applicator. At a subsequent heating station an upper belt is provided that applies pressure to the mat. The heating station also includes heating elements positioned above and below the mat structure. The pressure and heat cause the mat structure to flatten out and the adhesive to become plasticized. Next, a cooling station is provided that brings the temperature of the mat down below the initial plasticizing temperature of the adhesive. This causes the adhesive to re-solidify and bind the fibers together.

Another method of making fibrous mats is disclosed in U.S. Pat. No. 5,051,122 to Reese et al. Reese discloses a method of making mats of continuous glass fiber strands in which a heated calendaring roll and continuous belt are used to compact the mat. A plurality of strand feeders are traversed across the surface of a moving perforated conveyor with each feeder drawing at least one continuous strand from a supply source and projecting it onto the surface of the conveyor belt to form a loose fibrous mat structure. Powdered resin particles are distributed over the loose mat, which is then passed between a second moving conveyor or belt and at least one heated calendaring roller. One embodiment uses water to wet the mat for easier distribution of the resinous material. As the mat passes to a second conveyor belt it is pinched between the surfaces of the conveyor and a separately driven, rotating, heated calendar roll. As the mat passes around the circumference of the roll it is compacted against it by the tension of the belt. As the belt turns, it separates the compacted mat from the calendar roll and continues its path. Steam from the heating of the mat by the calendar roll is vented away by means of a hood.

Although each of the above references discloses a useful construction method, the references also suffer from certain disadvantages. For instance, each of the references applies a resin or adhesive in a particulate or granular form. This application technique requires multiple steps and does not adequately coat the underlying fibers. As a result there is insufficient bonding between adjacent fibers. The background art likewise fails to illustrate a method for constructing fibrous mats in conjunction with composite building boards. The system and method of the present disclosure are aimed at overcoming these and other shortcomings in the background art.

SUMMARY OF THE INVENTION

The present disclosure relates to systems and methods for constructing fibrous mats. The disclosure also relates to systems and methods for incorporating fibrous mats into composite building boards.

One possible advantage of the present disclosure is realized by constructing fibrous mats from lengths of filament that are pre-coated with thermoplastic.

Another advantage is attained by fully coating continuous lengths of filament with a liquefied thermoplastic prior to incorporating the lengths of filament into a fibrous mat.

A further possible advantage is achieved by heating filaments after they have been laid upon a forming table to thereby liquefy a pre-coating and facilitate bonding between intersecting filaments.

Yet another potential advantage is fulfilled by constructing a fibrous mat and then incorporating the constructed mat into a composite building board.

It is also an advantage to construct a fibrous mat that does not require paper facing sheets or backing sheets but that can still be incorporated into a building panel.

Various embodiments of the invention may have none, some or all of these advantages. Other technical advantages of the present invention will be readily apparent to one of ordinary skill in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to a system and method for constructing fibrous mats. In accordance with the disclosure, continuous lengths of filament are pre-coated with a liquefied thermoplastic. The pre-coated filaments are then laid down upon a belt to form a fibrous mat. The filaments can be laid down in continuous lengths or they can be chopped into discontinuous lengths. The filaments are heated after they have been laid down in order to re-liquefy the thermoplastic and facilitate bonding between intersecting fibers. The disclosure further relates to a system and method for incorporating constructed fibrous mats into a composite building board. The various features of the present disclosure, and the manner in which they interrelate, will be described in greater detail hereinafter.

Figure 1:
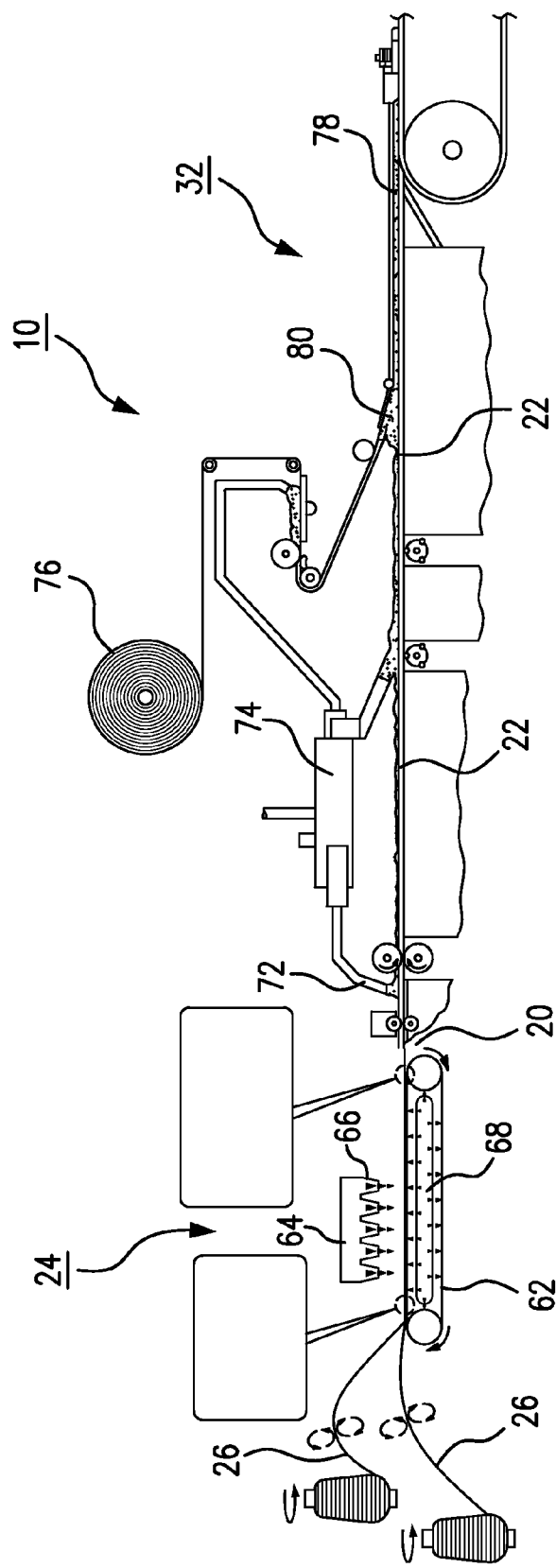
FIG. 1 is a side elevational view of a manufacturing process in accordance with the present disclosure.

The preferred manufacturing system 10 illustrated in FIG. 1 includes a single manufacturing line 20 that may consist of a series of forming tables 22. The initial portion 24 of the line is employed in constructing a fibrous bound mat from continuous lengths of filament 26. As described in more detail hereinafter, these lengths of filament 26 are pre-coated with thermoplastic prior to being into a fibrous mat 28. The latter portion of the manufacturing line 32 then incorporates fibrous bound mats 28 into a composite building board. This latter portion of the line may incorporate the manufacturing methods disclosed in commonly owned U.S. Pat. No. 6,524,679 to Hauber, and entitled "Glass Reinforced Gypsum Board." The contents of the '679 patent are fully incorporated herein for all purposes.

Figure 2:
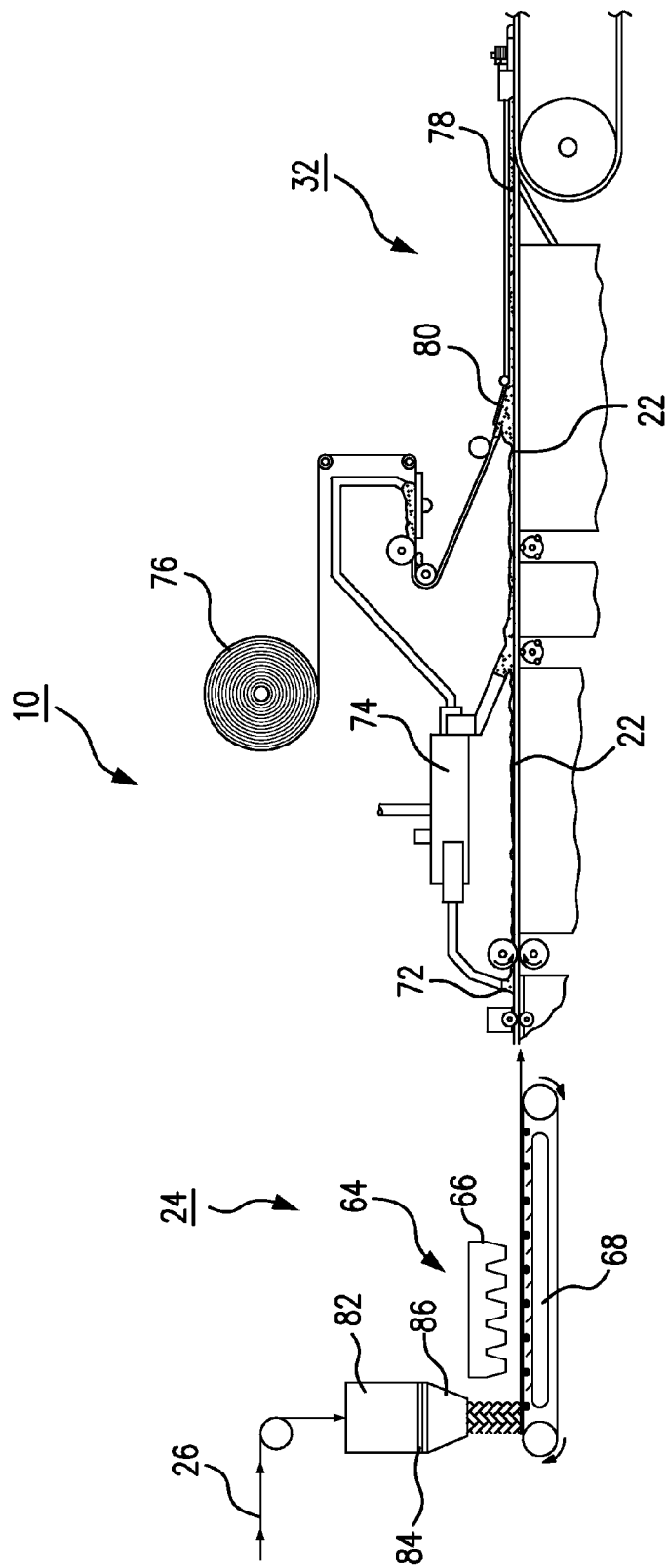
FIG. 2 is a side elevational view of an alternative manufacturing process in accordance with the present disclosure.

FIG. 2 is an alternative embodiment that is similar in many respects to the manufacturing line of FIG. 1. Namely, the initial portion of the line 24 is utilized for forming fibrous mats 28 while the later portion incorporates the fibrous mats 28 into composite building boards. However, the manufacturing line of FIG. 2 utilizes a filament chopper to cut the continuous lengths of filament into discontinuous lengths. The discontinuous lengths of fiber are then randomly deposited upon the forming table. Notably, both embodiments start with continuous lengths of filament 26 that are initially pre-coated with a hot melt thermoplastic.

System for Coating Filaments with Thermoplastic

Figure 3:
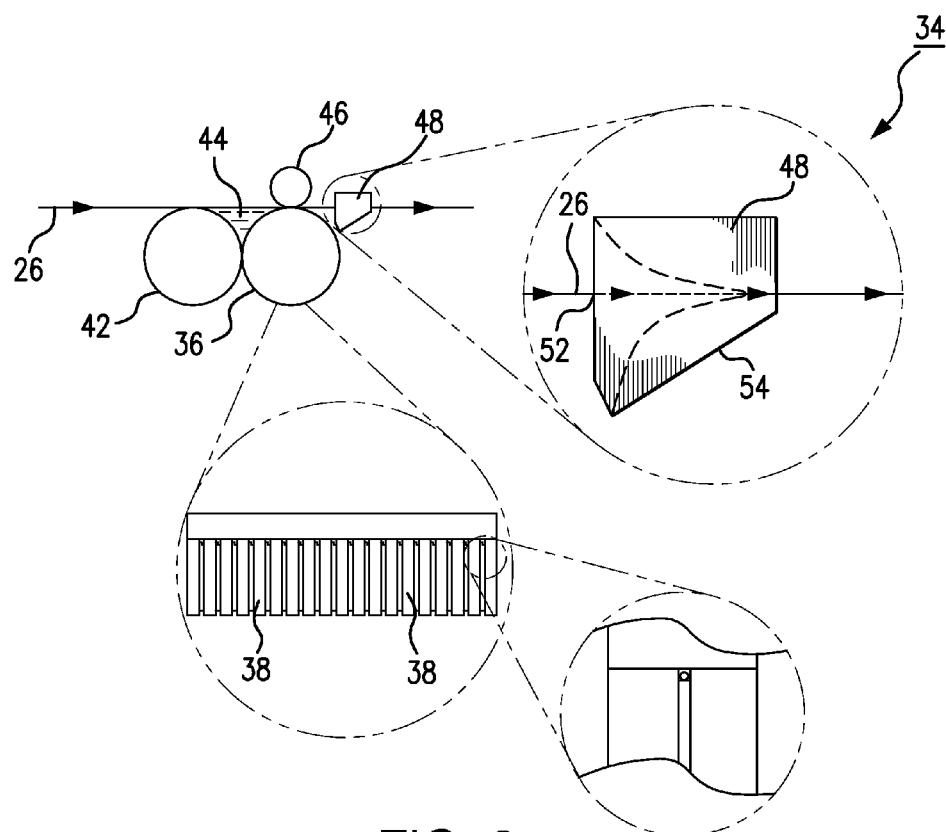
FIG. 3 is a side elevational view of an apparatus for pre-coating individual fibers prior to incorporating the fibers into a mat construction.
Figure 4:
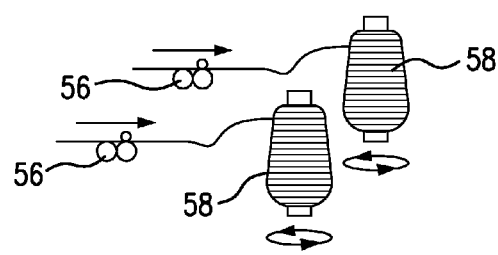
FIG. 4 is a view of spools that are used to store the filaments after they have been pre-coated and prior to being incorporated into a fibrous mat.

The plurality of individual lengths of filament 26 are initially dispensed in an uncoated state from a plurality of corresponding filament feeders. Alternatively, the fibers can be directly supplied from a filament manufacturing process. In the preferred embodiment, filaments 26 having a diameter ranging from a minimum of approximately 1 micron to a maximum of approximately 5,000 microns. The term "filament" as used herein includes monofilaments and multiple filaments that are bound together into a roving. It further includes spun multifilament strands and woven multifilament strands. The number of filaments 26 used will depend upon the size and density of the fibrous mat 28 being constructed, and the present disclosure is not limited to any particular number of filaments 26. However, it is envisioned that between 2 to 2000 individual filaments 26 can be utilized. After the filaments 26 are dispensed from the feeders, they are routed via guide rollers to a coating station 34, which is depicted in FIG. 3. At coating station 34, the uncoated lengths of filament 26 are each immersed in a thermoplastic pre-coating.

In the preferred embodiment each of the filaments is coated with a volume of liquefied hot melt thermoplastic binder. The binders may be organic or inorganic or a combination thereof. The objective is to provide a binder that holds the individual fibers in place and offer tensile resistance and flexibility. The preferred thermoplastic binders include, any of the following, used either individually or in combination with one another: Acrylonitrile butadiene styrene (ABS), Celluloid, Cellulose Acetate, Ethylene-Butyl Acrylate, Ethylene-Methyl Acrylate, Ethylene Vinyl Acetate (EVA), Ethylene-Acrylic-Acid-copolymer (EAA); Ethylene Vinyl Alcohol (EVAL), Fluoroplastics (PTFEs, including FEP, PFA, CTFE, ECTFE, ETFE), ionomers, Liquid Crystal Polymer (LCP), Polyacetal (POM or Acetal), Polyacrylates (Melt and Cure Acrylics), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene Terephthalate (PBT), Polyethylene Terephthalate (PET), Polycyclohexylene Dimethylene Terephthalate (PCT), Polycarbonate (PC), Polyketone (PK), Polyester, Polyethylene/Polythene/Polyethene, Polyether Block Amide (PEBA), Polyetheretherketone (PEEK), Polyetherimide (PEI), Polyethersulfone (PES), Polyethylenechlorinates (PEC), Polyimide (PI), Polyactic Acid (PLA), Polymethylpentene (PMP), Polyphenylene Oxide (PPO), Polyphenylene Sulfide (PPS), Polyphthalamide (PPA), Polypropylene (PP), Polystyrene (PS), Polysulfone (PSU), Polyvinyl Chloride (PVC), Spectralon, and thermoplastic Olefinic Elastomers (TPO). Application melt point temperature of the preferred thermoplastics will range from a minimum 100 degrees Fahrenheit of to a maximum of 500 degrees Fahrenheit. A silane coupling agent, $Y—Si(OR)_3$ may be used to increase the bond strength of any of the hot melt thermoplastics listed above. The silane coupling agent also offers many beneficial results, including improved durability, mechanical properties, electrical properties, and binder dispersion 29.

The thermoplastic coating may contain filler compounds which are intended for uses which may include but are not limited to color (opaque or translucent), UV resistance, tackifying property enhancement, thermal insulation, thermal conductivity, electrical conductivity, electrical non-conductivity, water resistance, water vapor transmission enhancement, water vapor transmission inhibition, light absorption, light refraction, sound propagation, sound inhibition, elastomeric enhancement, rigidity enhancement, impact resistance, puncture resistance, abrasion resistance, volumizing, densifying, fire resistance, sound reverberation, and gaseous, liquid, or vapor toxic compound absorption.

The details of the coating station 34 are described next in connection with silane 3. The particular coating station 34 depicted is only one example of how the filaments 26 may be coated and other coating techniques are within the scope of the present disclosure. Station 34 includes an application roller 36. Application roller 36 has a series of circumferential grooves 38 formed within its outer face. Each groove 38 is dimensioned to receive an individual length of filament 26. In the preferred embodiment, the total number of filament feeders corresponds to the total number of grooves 38 within application roller 36.

The station 34 further includes supply roller 42. Supply rollers are well known in the art. One portion of supply roller 42 is in contact with a volume of liquefied thermoplastic 44, and another portion of supply roller 42 contacts application roller 36. In this manner, supply roller 42 transfers a select volume of the liquefied thermoplastic 44 from supply 42 to the surface of application roller 36. Accordingly, individual links of filament 26 that are positioned within grooves 38 become coated with liquefied thermoplastic 44 transferred by supply roller 42.

Coating station 34 further includes a pinch roller 46 which is operatively disposed over top of application roller 36. This pinch roller 46 maintains positive contact with the outer peripheral surface of application roller 36. Pinch roller 46 functions in keeping the individual lengths of filament 26 within the corresponding grooves 38 on application roller 36 as it rotates.

A metering block 48 is optionally included at the end of coating station 34. The preferred metering block 48 is designed to remove excess thermoplastic from filaments 26. Metering block 48 includes a plurality of individual apertures 52 that are dimensioned to receive an individual length of filament 26. The exit of block 48 includes a lower lip 54 that allows the excess plastic removed by apertures 52 to run-off. The thermoplastic run-off can be collected and reused or it can be discarded. Metering block 48, thereby, controls the specific application rate and coverage to the continuous length of fiber 26 so as to provide a desired binder effect. Applied film thicknesses of the above mentioned hot melt thermoplastic coating/binder may range from a minimum of 0.01 mils to and maximum of 50 mils in thickness. The coating may be applied in equal or unequal levels.

The operation of the coating station 34 is as follows. A series of uncoated filaments 26 are dispensed from filament feeders. Guide rollers are then employed in routing the filaments to the start of coating station 34. Filaments 26 are then guided into grooves 38 within application roller 36. As application roller 36 rotates, it is continuously supplied with liquefied thermoplastic 44 via supply roller 42. The continued rotation of application roller 36 ensures that the entire outer circumferential area of each length of filament 26 is fully immersed by thermoplastic. Excess thermoplastic is then removed by metering block 48. The specific metering block employed will depend upon the intended application of the fibrous mat. The coating should maintain full circumference coverage so as to offer greater contact area for multi-directional adhesion to all surrounding and jointly incorporated fibers. The coverage may extend between 0.1% of the filament to 100% of the filament.

Finally, the coated filaments 26 are routed away from the coating station via guide rollers 56. As the filaments are guided away, the thermoplastic coating 44 is permitted to cool and solidify. Alternatively, the cooling step can be carried out via a direct or indirect cooling mechanism. Finally, each coated length of filament 26 is wound upon a spool 58. Coated filaments 26 can otherwise be accumulated by spooling, loose/drop accumulation, or may be continuously supplied to the manufacturing line. In the depicted embodiment, coated filaments 26 are stored on spools 58 until needed. As described more fully hereinafter, coated filaments 26 are thereafter dispensed from spools 58 during the construction of the fibrous bound mats 28.

Continuous Filament Fibrous Mat

Once filaments 26 are coated in the manner described above they are ready to be formed into fibrous mats 28. As noted in FIG. 1, spools 58 of pre-coated filament 26 are positioned at the start of manufacturing line 20. Spools 58 may take the form of filament feeders. Spools 58 are initially unwound such that the lengths of filament 26 are laid down upon a forming table 62. To accomplish this, spools 56 may be moved in a back and forth or side to side manner such that each length of filament 26 is deposited on the forming table 22 in a randomized pattern. Ideally, fibers 26 are laid down so that there is an equal distribution by weight. As a result of the randomized pattern, individual filaments 26 will intersect one another at a number of filament intersections 26(*a*). The density of the filament intersections 26(*a*) will depend upon the number of individual lengths of filament 26 being deposited. The number of filaments 26 employed, in turn, will be chosen by the operator depending upon the intended use of mat 28.

The forming belt 62 that filaments 26 are laid upon is ideally formed from a solid, mesh, or linked construction. Belt 62 also preferably includes a liquid retention characteristic so as to offer a nonstick surface to the thermoplastic coating and to further promote cross adhesion between the fibers. Forming belt 62 may also be formed from organic or inorganic materials or blends of both.

The randomized filament pattern is then transported on the belt to a heating station 64, which includes a number of overhead heating elements 66. In the preferred embodiment, heating elements 66 heat the filament pattern to a temperature of between approximately 100° F. to 1,000° F. Direct or indirect heating (or combinations thereof) can be employed. Heating station 64 thus heats filaments 26 to a degree sufficient to re-liquefy, or plasticize, the thermoplastic precoating. Once re-liquefied, the coatings 44 on adjacent filaments mix with one another. As the filament pattern is transported down the belt, it cools and solidifies. The cooling can be accomplished via ambient temperatures that exist following the heating station. Cooling typically happens nearly instantaneously following the heating station. The advantage of employing a hot melt thermoplastic is that a secondary cooling step is not required to re-solidify the plastic. However, a chilled forming line 68 can be employed downstream of heating station 64 if needed. Heating and cooling steps can be provided intermittently or continuously or in steps of increasing or decreasing temperature. The heating and subsequent cooling of the filaments results in a bonding of filament intersections and a creation of a fully integrated bound fibrous mat.

The preferred surface hardness attained as a result of the thermoplastic coating may result in a range of hardness's equal to a minimum of about 15 to a maximum of about 150 on a Rockwell R Hardness scale, or a minimum of about 10 to maximum of about 70 on a Shore A and D Hardness scale. The preferred air permeability of the applied thermoplastic coating/binder may range from a minimum of 0.01 CFM/ft$^2$/sec to a maximum of 1500 CFM/ft$^2$/sec (Frazier Permeability Test using a nozzles ranging from a maximum of 8 mm and ranging to a minimum 2 mm nozzle), thus the coating may be virtually impervious to the transmission of water vapor movement or completely open to the transmission of water vapor movement.

Following formation of the bound fibrous mat, it can be incorporated into a composite building board. Some of these building board manufacturing steps are outlined in commonly owned U.S. Pat. No. 6,524,679 to Hauber, and entitled "Glass Reinforced Gypsum Board." The contents of the '679 patent are fully incorporated herein for all purposes. The steps broadly include depositing a gypsum slurry from a shoe 72 over top of the fibrous mat 28. The slurry is supplied from a slurry mixer 74. This gypsum slurry will subsequently form the core of the building board. Thereafter a second fibrous mat 76 is laid down over top of the gypsum core to form a composite panel 78. This second fibrous mat 76 may be formed in the manner described above. Alternatively, fibrous mat 28 may be formed from a variety of other manufacturing techniques. Finally, the composite panel 78 is delivered to a forming station 80 where it is pressed into a uniform thickness. As is known in the art, the formed panel 78 can then be cut into lengths as needed depending upon the intended application of the board.

Noncontinuous Filament Fibrous Mat

An alternative manufacturing process is illustrated in FIG. 2. This process is the same in all respect to the process outlined in connection with FIG. 1. However, the process of FIG. 2 utilizes discontinuous lengths of filament in the construction of the fibrous mat. To accomplish this, the continuous, uncoated lengths of filament are dispensed from spools 58 as noted above, but they are then delivered into a filament chopper 82. Filament chopper 82 is used in cutting the continuous lengths of filament. A single chopper 82 can be provided or an set of parallel choppers can be used. Chopper 82 creates a number of shorter fibers of random lengths. The cut filaments will have individual fiber lengths ranging from 0.1 centimeters to 45,720 centimeters. These short fibers are then gathered into an accumulator 84 and shaker 86. Shaker 86 ensures that the individual cut fibers 26 are delivered in a randomized pattern to forming belt 62. Ideally, fibers 26 are laid down so that there is an equal distribution by weight across forming belt 62. A weighing belt can be employed to verify the density of the deposited fibers. The randomized fiber pattern will include a plurality of filament intersections.

The filaments utilized in the construction of the fibrous mats can be composed organic fibers, inorganic fibers, or a blend of both organic and inorganic fibers. The fibers can be laid down in a woven or non-woven arrangement or a combination thereof. When bound by the thermoplastic, the resulting mat will exhibit tensile resistance in the +X, −X, +Y, −Y, +Z, and −Z orientations. The mat will also be capable of offering resistance to pull force in any direction. Additionally, the mat will have increased flexibility, fracture and breakage resistance, composite assimilation, and thermal resistance. The mat will have manufacturing valve in an number of different applications, including as a mat, tissue, fabric, or scrim.

The mat finds particular application in a composite building board for use as a glass reinforced gypsum panel. However, the fibrous mats can also be used as, composite gypsum building panels, gypsum fiber building panels, cement board, fibrous cement boards, gypsum fiber siding, fibrous cement siding, cement siding, gypsum cove or cornice, fibrous gypsum cove and cornice, cement cove and cornice, fibrous cove and cornice, magnesium oxide building boards, magnesium oxide cove and cornice, magnesium oxide siding, magnesium oxide shingles, asphalt impregnated shingles, asphalt coated shingles, asphalt impregnated building raps, organic polymer coated, inorganic coated building raps, organic/inorganic blended coated building raps, tapes incorporating continuous or non-continuous or blended continuous and non-continuous (mats, scrims, tissues, fabrics) materials, corner bead, carpet, reinforced plywood, reinforced layered polymer composites, and reinforced molded or extruded organic or inorganic or blended organic and inorganic materials (including reinforced geometrical substrates, reinforced rigid or flexible plastic tubing, and reinforced cylinders).

In all instances, the fiber mat of the present disclosure does not require additional paper facing sheets or backing sheets. Mats constructed in accordance with this disclosure have the benefit of lower costs as compared to conventional mat constructions. Manufacturing costs may be reduced by as much as 30% to 50%

Figure 6:
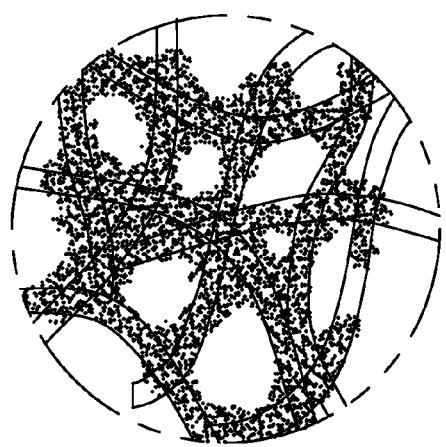
FIG. 6 is a close up view of the fibrous mat illustrating the pre-coating and individual filament interconnections.
Figure 7:
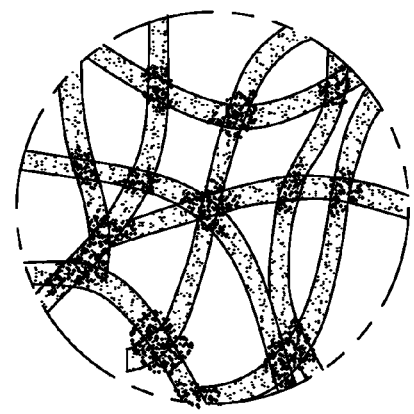
FIG. 7 is a close up view of the fibrous mat illustrating the pre-coating and individual filament interconnections.
Figure 5:
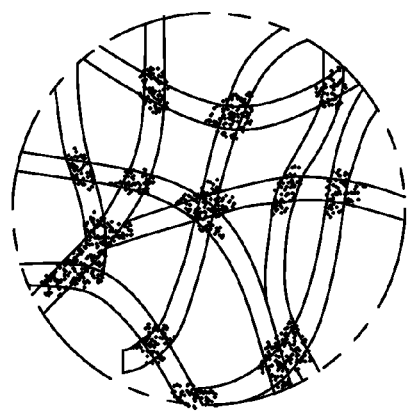
FIG. 5 is a close up view of the fibrous mat illustrating the pre-coating and individual filament interconnections.

FIGS. 5-6 illustrate the application of the thermoplastic coating upon individual filaments in varying degrees of density. FIG. 5 illustrates cross fiber bonding after the application of the thermoplastic. FIG. 6 shows the thermoplastic being applied in a greater density to effectively reduce or close off the permeability of the resulting mat. Porosity of the may can be varied from 0% to 95%. FIG. 7 illustrates the individual fibers being fully coated by the thermoplastic. Depending on the desired outcome, whether improved fiber/filament to fiber/filament shear resistance is wanted, or improved tight radius flexibility of the mat is wanted, or reduce air or liquid permeability is wanted, the hot melt thermoplastic binder can either be formulated to provide partial or complete fiber/filament coverage or it can be made to web more at fiber/filament intersections/crossings. Properties such as this can be achieved by chemical formulation variation or by simply adjusting the fusing temperature when the mat is being formed on the forming belt. A great advantage of this disclosure is that variations in temperature alone, rather than persistent reformulation changes as is required with traditional thermal setting binder technology, can yield dramatic product variations/functionality without added cost for reformulation of the binder. This is accomplished by the fact that each fiber/filament is pre-coated with the hot melt thermoplastic prior to forming the mat, tissue, fabric or material.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method of manufacturing a composite building board including one or more fibrous mats, the method comprising:
   providing a plurality of spools, each of the plurality of spools including a continuous length of an individual filament, each individual filament being pre-coated with a hot melt thermoplastic;
   unwinding each of the spools to lay down each individual filament in a randomized pattern upon a forming table, the randomized pattern including a plurality of intersections defined by two or more intersecting filaments;
   heating the randomized pattern of filaments upon the forming table to a temperature of between approximately 100° F. to 1000° F., the heat melting the hot melt thermoplastic pre-coating upon each length of filament;
   cooling the randomized pattern of filaments to an ambient temperature, the heating and cooling resulting in the bonding of the filament intersections and the creation of a first fibrous mat;
   depositing a gypsum slurry upon the fibrous mat, the deposited gypsum slurry forming the core of the composite building board;
   laying down a second fibrous mat overtop of the gypsum core to form a composite panel;
   delivering the composite panel to a forming station whereby the composite panel is pressed into a uniform thickness.

2. A method of manufacturing a composite building board including one or more fibrous mats, the method comprising:
   providing a continuous length of an individual filament;
   pre-coating the filament with a thermoplastic binder;
   winding the continuous, pre-coated filament upon a feeder;
   unwinding the pre-coated filament from the feeder in a randomized pattern upon a forming table, the randomized pattern including a plurality of filament intersections;
   heating the randomized pattern upon the forming table to melt the thermoplastic binder;
   cooling the randomized pattern to an ambient temperature, the heating and cooling resulting in the bonding of the filament intersections and the creation of a first fibrous mat;
   depositing a gypsum slurry upon the fibrous mat, the deposited gypsum slurry forming the core of the composite building board;
   laying down a second fibrous mat overtop of the gypsum core to form a composite panel.

3. The method as described in claim 2 comprising the further step of adding a silane coupling agent, $Y\text{---}Si(OR)_3$ to the thermoplastic binder prior to coating the filament.

4. The method as described in claim 2 wherein the thermoplastic binder is applied with a thickness of between approximately 0.01 mils to approximately of 50 mils.

5. The method as described in claim 2 wherein the melting point of the thermoplastic binder ranges between 100° F. to 500° F.

6. A system for coating continuous lengths of filament, the system comprising:
- a plurality of filament feeders, each of the filament feeders supplying a length of filament;
- a supply of hot melt thermoplastic, the hot melt thermoplastic being heated and liquefied;
- an application roller having a grooved outer peripheral surface, each of the grooves adapted to receive a length of filament from a filament feeder;
- a supply roller positioned adjacent the application roller, the supply roller delivering a volume of the liquefied thermoplastic to the outer peripheral surface of the application roller, whereby filaments within the grooves are coated with liquefied thermoplastic;
- a pinch roller in contact with the outer peripheral surface of the application roller, wherein the pinch roller keeps the lengths of filament within the grooves of the application roller as the filaments are being coated;
- a metering block, the metering block including a plurality of apertures for receiving the lengths of filament, the metering block further including a run off lip for draining excess volume of liquefied thermoplastic from the lengths of filament.

\* \* \* \* \*